United States Patent [19]

Kyomen

[11] 4,157,372
[45] Jun. 5, 1979

[54] METHOD OF MOLDING A CONNECTING SOCKET PART ON A SYNTHETIC RESINOUS PIPE END

[75] Inventor: Junsuke Kyomen, Sakai, Japan

[73] Assignee: Kubota, Ltd., Osaka, Japan

[21] Appl. No.: 715,655

[22] Filed: Aug. 19, 1976

[30] Foreign Application Priority Data

Aug. 19, 1975 [JP] Japan ................................ 50-101057

[51] Int. Cl.² ............................................. B29D 23/00
[52] U.S. Cl. .................................... 264/296; 264/322; 425/393; 425/DIG. 218
[58] Field of Search ....................... 264/322, 296, 313; 425/393, 392, 387, DIG. 218

[56] References Cited

U.S. PATENT DOCUMENTS

| | | | |
|---|---|---|---|
| 3,557,278 | 1/1971 | Kuhlemann | 264/322 X |
| 3,825,392 | 7/1974 | Ligon | 425/387 R |
| 3,867,086 | 2/1975 | Edwards | 425/393 |
| 3,899,565 | 8/1975 | DePutter | 264/296 |
| 3,929,958 | 12/1975 | Parmann | 264/296 X |
| 3,942,935 | 3/1976 | Heisler | 264/322 X |
| 3,975,493 | 8/1976 | Tigner | 264/313 |
| 3,991,150 | 11/1976 | Putter | 264/312 |
| 4,044,092 | 8/1977 | Spears | 264/296 X |

FOREIGN PATENT DOCUMENTS

| | | | |
|---|---|---|---|
| 1286294 | 8/1969 | Fed. Rep. of Germany | 264/322 X |
| 2242923 | 7/1974 | Fed. Rep. of Germany | 425/392 X |
| 49-1919 | 4/1974 | Japan. | |

Primary Examiner—Thomas P. Pavelko
Attorney, Agent, or Firm—Oblon, Fisher, Spivak, McClelland & Maier

[57] ABSTRACT

A method of molding a connecting socket part on a synthetic resinous pipe, wherein a first internal groove is formed as to be able to seat stably a resilient packing therein, and a second groove also is formed inwardly of the first groove and simultaneously therewith. A resultant molding article is thereby formed in such a manner that the pipe axis of another pipe interconnected therewith is bendable within the above-mentioned second groove. Consequently the circumferential wall of the connecting socket part of the pipe has irregularities yielding to necessity. The metallic core mold used for making up the connecting socket part, for this reason, has a form including some segments which come together to form a surface equivalent in shape to the internal circumferential surface of the connecting socket part which is to be formed. The configuration of the segments thus formed contributes to the smooth operation of assembling the core metallic mold and of dismantling after conclusion of a single operation cycle.

4 Claims, 24 Drawing Figures

FIG.24

METHOD OF MOLDING A CONNECTING SOCKET PART ON A SYNTHETIC RESINOUS PIPE END

BACKGROUND OF THE INVENTION

1. Field of the Invention

Figure 1:
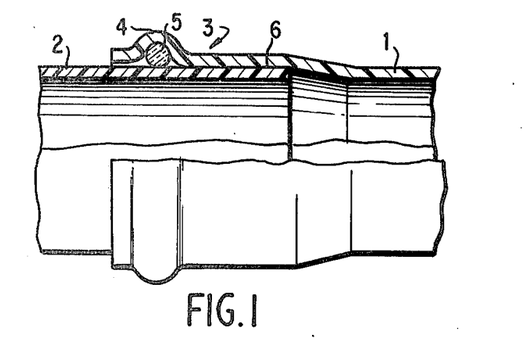
FIG. 1 shows a heretobefore well-known pipe connecting socket part in a sectional view of its upper half.

In interconnecting two pipes made of synthetic resinous material, it has been well known to insert the end part of one pipe into the connecting socket part of the other pipe end which has been provided with a relatively large diameter groove in the socket part, and to bond the two pipes by the use of some appropriate adhesives and/or a packing of a kind. Further, in connecting the pipes with the help of a packing, it was also a matter of common knowledge to form the pipes with a small clearance therebetween for the purpose of absorbing a bending external force. The pipe connecting socket part shown in FIG. 1, a partially cutaway view, for example, was constructed by thrusting a heat-softened end of a connecting pipe 1 into the core metallic mold for the purpose of molding the connecting socket part, or otherwise by inserting the latter into the former. Thus the connecting socket part 3 is provided on the inner peripheral surface of its own opening side with an annular groove 4 wherein a resilient packing 5 is to be inserted. This groove 4 was molded by a shunting metallic mold as an undercutting piece of the core metallic mold. The connecting socket part 3 thus formed had almost the same diameter, or a little larger, as compared with the spigot pipe hitherto, so it could not absorb quite a medium of variable external force.

2. Description of the Prior Art

Figure 3:
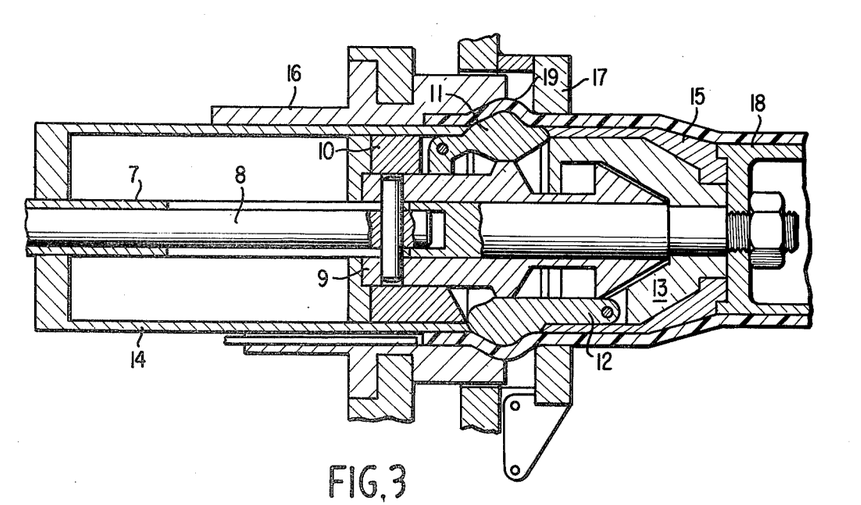
FIG. 3 is a sectional view to depict the heretobefore well-known metallic core mold for forming the connecting socket shown in FIG. 1.
Figure 4:
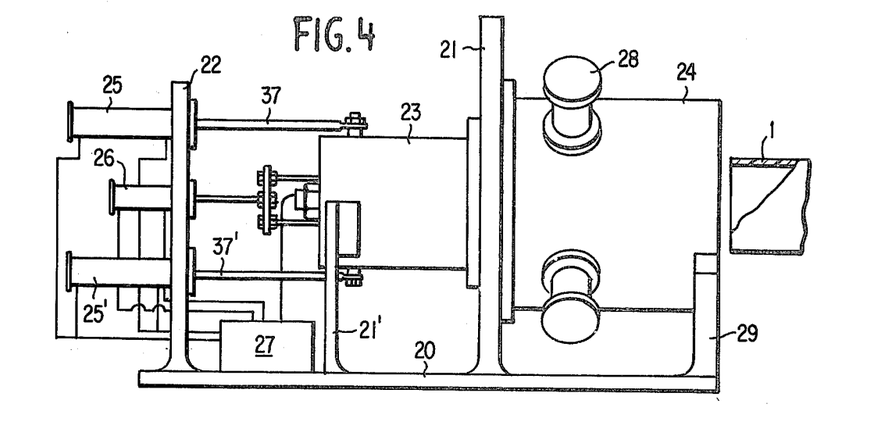
FIG. 4 is a side view of an apparatus as a whole for the working of this invention.

Referring to the formation of such a type of a connecting socket part on a pipe end, the most popular is a metallic core mold as disclosed in German Pat. No. 2,242,923, such as shown in FIG. 3. This metallic core mold for forming purposes has a movable section consisting of a shifting annulus 9 slidably provided on a fixed core axle 7, another annulus 10 floatingly inserted into the shifting annulus 9, and segments 11 freely supported by the annulus 10. On the other hand, its immovable section is constituted by other segments 12 which are pivoted by a fixed annulus 13 tightly secured on the core axle 7. These segments 11 and 12 are held while impinging on both ends of a fixed sleeve 15 and shifting sleeve 14. Segments 11 and 12 are alternately disposed in a circle with the object of creating groove 4 on a connecting socket part 3 of a pipe. The figure referred to shows the segments 11 and 12 thrusted outwardly. It is with the help of a thrust spring ring provided on the shifting annulus 9 that segments 11 and 12 have been radially expanded. On rare occasion, a softened pipe 18 is press-inserted thereinto, with these segments 11 and 12 being expanded, but in ordinary circumstances, it is typical to insert the softened pipe 18 with segments 11 and 12 shunted back in the unexpanded state, and then these segments 11 and 12 are radially expanded so as to form the groove 19. The reference numeral 17 designating an outer frame which is situated directly opposite the segments 11 and 12 and forms the groove in a pipe in cooperation with the segments 11 and 12. On completing the formation, a shifting annulus 9 moves in the leftward direction by means of a working lever 8, and the thrust spring-ring of the shifting annulus 9 shunts down segments 11 and 12 to the unexpanded state from the outer circumference of the metallic core mold. At the same time, the thrust spring-ring hitches the under projections of segments 11 through the movement of the shifting annulus 9 to draw back the annulus 10. Both segments are at this point released from each other. The shifting sleeve 14 thrusts, as if embracing these segments, to the side of the fixed sleeve 15, thus helping the smooth insertion of the softened pipe 18.

For all that, it is hard to form a somewhat deep groove, particularly such as requires a sharp rising angle, by the use of such a king of pivot-supporting means of segments. This is the very reason why, owing to the short distance between the pivot-supporting part of the segments, particularly of segments on the shifting side, and the convex part which is to form the groove, the circular arc diameter generated by the convex part is small, therefore making the movement of segments 11 and 12 difficult when the depth of the undercut is great, and the much-desired groove is sometimes thereby deformed. Accordingly, the metallic core mold of this type is unsatisfactory for the formation of a deep groove. In addition, it can be applied only to short-sized segments. As a natural consequence, there is no choice but to consider another new means for the simultaneous forming of a desired number of grooves using segments having a relatively long forming surface wherewith a groove for elastic packing and a space in the connecting socket are formed. In other words, in a metallic core mold which is composed of segments having long forming surfaces, the circumferential forming surface of the segment group must be able to shift and displace, maintaining continually nearly a parallel state to the axis of the metallic core mold, at the time of their assembling and dismantling.

BRIEF SUMMARY OF THE INVENTION

Figure 2:
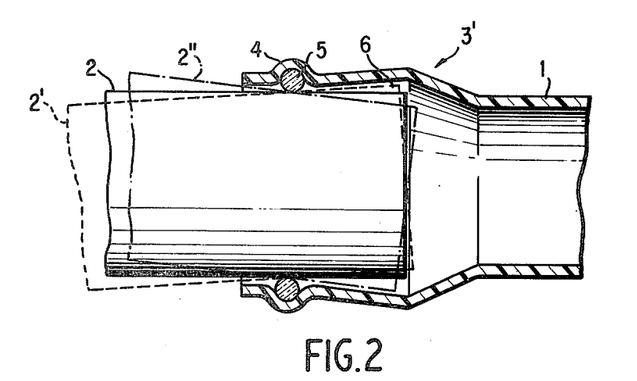
FIG. 2 is a sectional view illustrating a pipe and connecting socket part formed according to the present invention.

In interconnecting pipes, and particularly in embedded piping, e.g. in the field of water supply and drainage, there is required sometimes a connecting portion where the play space on the faucet pipe end may be preferably widened more than usual in consideration of the probability of pipe bending at the pipe connecting portion, especially in the case of a slightly bended piping where it is usually not worthwhile purposely to use bend pipes or joints. The same may be said in the case where the connecting portion will suffer due to loading in the bending direction caused by earthen pressure or non-uniform dip in the ground after the pipe interconnection. An example that sheds light on the above mentioned situation is swelled connecting portion 3' shown in FIG. 2 in a longitudinal section. Namely, the swelled connecting portion 3', which is formed at the end of the connecting pipe 1 in the same manner as described hereinbefore, is so molded as to have a greater diameter than the external diameter of the spigot pipe 2, this diameter as great as that of groove 4 where the resilient packing 5 is to be inserted, likewise as mentioned above. But the internal diameter of the connecting portion is so set that it grows wider and wider in the insertion direction beyond the groove 4, thereby resulting in the formation of a space or second groove therein. Through providing such a space 6, the spigot pipe 2 is allowed to shift in the limits from the dotted line 2' to the imaginary line 2", which is supported by the resilient packing 5 as a fulcrum. This allowable limit for shifting makes possible the absorption of bending formation due to the earthen or passing vehicles' pressure in the case of the embedded piping. On the other hand, a slight bending occasionally needed in the bend piping, such as described above, can be achieved with the help of a connecting socket of this kind. Thus, it leads to a very reasonable piping work.

Accordingly, it is an object of the present invention to provide a method of molding a connecting socket part on a synthetic resinous pipe which comprises a metallic core mold which, in forming the connecting socket part at one end of the synthetic resinous pipe, is able to mold simultaneously a groove for the insertion of a packing and a second groove or space for a spigot pipe which is to be inserted thereinto with a view to the practicability of bend piping, if not in a degree to speak of, by the use of such a kind of pipe connecting socket part that is able to allow some bending of the pipe axis thereat.

Another object of the invention is to provide such a method as characterized herein when the connecting socket part can absorb, at the very connecting portion, the strain due to the bending variation of the piping which has been conducted by the use of this connecting socket part, thereby preventing from occurring the pipe breakage caused by the deformation through external force applied on the piping.

A further object of the present invention is to provide an easy to handle and reliable metallic core mold having a gradually widening diameter, segment-supporting and segment-holding means for the purpose of smooth segment shunting, in view of the fact that such segments which form an undercut section of the metallic core mold that is to form a pipe end connecting socket part of such a type can not do without a relatively long forming surface.

A still further object of the present invention is to provide a pressure actuated mean which works with the help of a pressure medium in order to actuate the working members constituting the metallic core mold with a high degree of reliability.

Still yet another object of the present invention is to provide a method of molding a connecting socket part on a pipe end wherein a wall-thickening means is used in the pipe end which is loaded on the metallic core mold prior to its formation so as to prevent the pipe wall of the end of the connecting socket part from becoming thinner at the time of making use of the metallic core mold for the forming purpose.

As for the other and further objects of this invention, they will be understood from the following description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, and more particularly to FIGS. 1-7 thereof, a metallic core mold for the forming purpose is designated by the reference numeral 30. To a supporting wall 21 laid on a bed plate 20 is attached a supporting cylinder 23, wherein is located a core axle 34, on the end part of which is furnished the metallic core mold 30. On the inside of the supporting cylinder 23 is slidably provided a shifting sleeve 14, which is slidable by means of working rods 37 and 37'. A fixture 33 planted in the shifting sleeve 14, serves as a fitting part for the working rods 37 and 37', and moves through slits 23' which are provided on the supporting cylinder 23. The reference numerals, 25 and 25' show working cylinders of the working rods 37 and 37', while 26 is a working cylinder of a shifting annulus (hereinunder to be set forth) of the metallic core mold 30. These working cylinders are attached to the supporting wall 22 and coupled with a control mechanism 27 respectively through the medium of their own pipes. This control mechanism incorporates some suitable air pressure generator and control valve, regardless of their type and kind, for the purpose of effectuating its function. Reference numeral 24 shows an outer barrel frame provided on the external circumference of the metallic core mold 30. In the outer barrel 24, outer molds 31, composed of split pieces, are suspended by the pistons of working cylinders 28.

Figure 5:
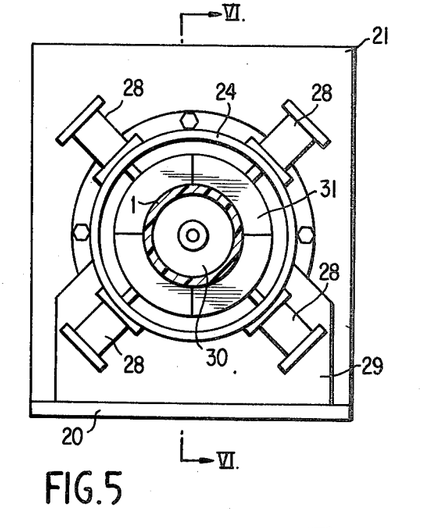
FIG. 5 is a front view showing the state of a pipe inserted on the right of FIG. 4.
Figure 6:
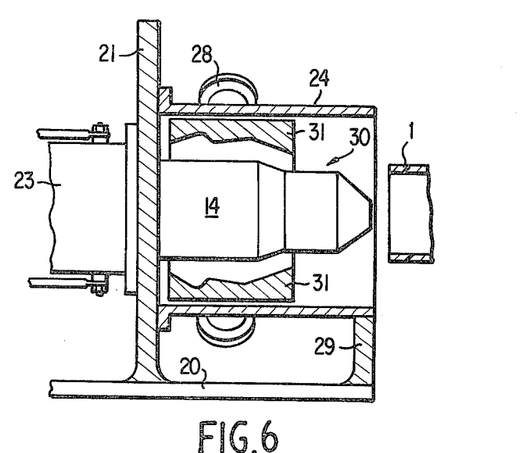
FIG. 6 is a sectional view of the metallic core mold part in FIG. 4, wherein a pipe is ready to be inserted.
Figure 7:
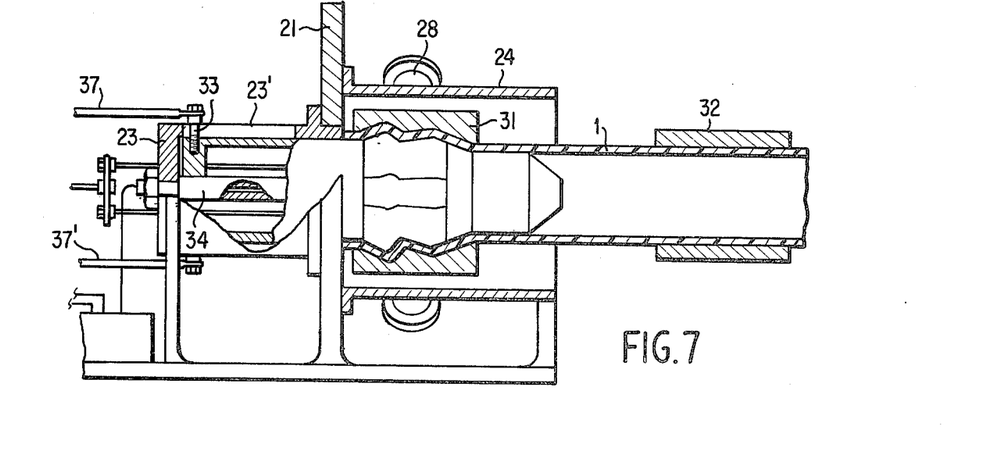
FIG. 7 is a partially sectional view of FIG. 4, showing the molded state of a pipe.

FIG. 6 shows a case where a pipe 1, which is to be formed in a connecting socket part, is facing the metallic core mold 30, which is so constructed that the shifting sleeve 14 moves forward to sheath the segment group and help the insertion of the pipe 1, and where outer molds 31, 31 rest in the shunt position. The pipe 1, which is softened by heating at its inserted part, is thrust in and sheathes the metallic core mold by means of a holding device 32, as outlined in FIG. 7. As the shifting sleeve 14 of the metallic core mold 30 draws backward, the segment group constituting the metallic core mold are expanded in the radial direction to form the metallic core mold for the connecting socket part. That is, as shown in FIG. 7, the inner form of the connecting socket part of the pipe 1 is formed by the thrustout of the segment group, while its outer form is given by thrust-on of the outer molds 31, as shown in FIG. 5. Numeral 21 is a supporting plate for the supporting barrel 23, and the symbol 29 is a supporting plate for the barrel frame 24. In a word, the principal part of the present invention resides first of all in the configuration of the metallic core mold 30 thus assembled and also relates to a method of molding a connecting socket part on a pipe end by the employment of such a type of the metallic core mold 30. Hence, it may be said that the working means of the shifting sleeve 14, the split outer molds 31 in the outer barrel frame 24, their arrangement and such, as previously described, will not restrict this invention.

Figure 8:
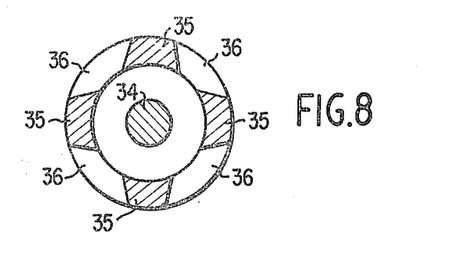
FIG. 8 is an elevation in section of segments assembled into the undercut part of the metallic core mold.
Figure 9:
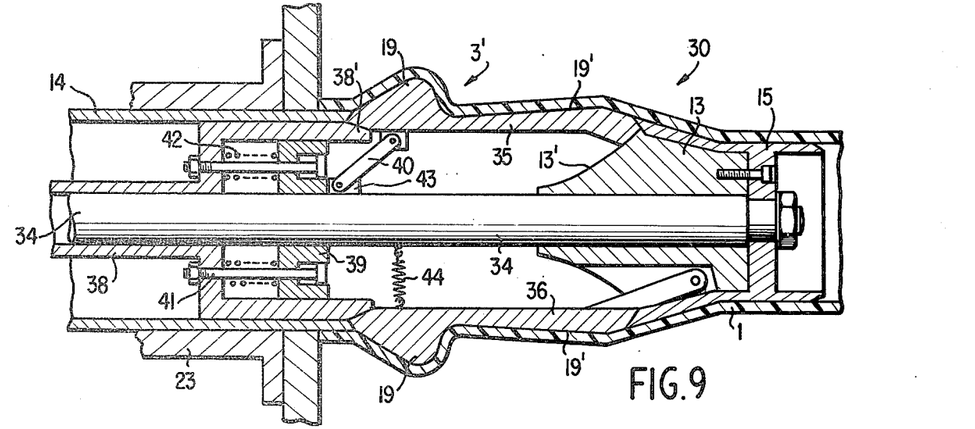
FIG. 9 shows the same metallic core mold shown in FIG. 7 in another section.

In the following, reference is made to the metallic core mold in accordance with the present invention. FIG. 8 is a transverse section showing the arrangement of segments in the metallic core 30. Each figure of the metallic core mold hereinafter expresses a longitudinal sectional view taken in the direction of the arrows substantially along the section line in FIG. 8. In FIG. 9, the metallic core mold 30 rests in a state where the connecting socket 3' is formed on the pipe 1 by the expansion of segments 35 and 26 side by side in the radial direction. Segments are classified into two different types, one being a mobile type and the other being a fixed type (36), but the contour of the top surface of each segment equally has an expanding part 19 which is to undercut the groove 4 and a raised part 19' which is to form the space (cf. FIG. 2). The mobile segments 35 are supported on the pivoted parts 43 of the supporting ring 39 through the aid of link arms 40. These pivoted parts make possible the free movement of the segments. Further, a play may be given to these pivoted parts, if necessary, because link arms 40 are used only as a mere coupler, particularly in the case of the present invention, where the position of segments is able to be held by a shifting barrel 38. When segments, however, must be directly supported only by link arms, it can not be thought of that a play would be introduced into the pivoted parts. The supporting ring 39, which supports link arms 40 on pivots, is resiliently connected through a coil spring 42 to the shifting barrel 38, which is slidably provided on the core axles 34 within the shifting sleeve. This coil spring 42 is held by the supporting lever 41 which is set afloat between the shifting barrel 38 and supporting ring 39. The outer edge 38' of the end part of the shifting barrel 38 is so set as to hold the segment group in cooperation with the end part of the shifting sleeve 14 while impinging upon the end part of segments 35 and 36. Though the working means of the shifting barrel 38 was not illustrated, its function is sufficiently fulfilled by connecting thereto the working lever of the working cylinder 26, shown in the preceding FIG. 4. On the other hand, the leg end of the fixed segment 36 is pivot-supported by a fixed annulus 13 tightly secured on the core axle 34 and the back side of its head part is connected to the core axle 34 through a spring member 44. The face of the fore part of the fixed annulus 13 inclines toward the core axle 34 to form an inclined surface 13' which causes the back end of the segment 35 that is shifting thereto to slide in the radial direction and stops it at the end of the fixed sleeve 15. In such manner, these segments are given a form, such as shown by the cross-sectional view in FIG. 8, for the formation of the inner face of the connecting socket 3' by being surely held and assembled with the help of the fixed annulus 13, shifting barrel 38 and sleeves 14 and 15. On forming and cooling the outer form of the pipe by the method as described above and below, segments 35 and 36 or the undercut part of the metallic core mold are longitudinally displaced. This displacement releases segments 35 and 36, which have been held at their ends, as the shifting barrel 38 draws back. The shifting barrel 38 continues further to retire till the segment 35 is longitudinally displaced by the link arm 40. In comparison with the segment 35, which is able freely to shift in the longitudinal direction, as shown in FIG. 8, the positioning of the other fixed segment 36 is regulated by the adjacent segments 35 on both sides. At this time, the aforementioned spring member 44 makes the segment 36 come into contact with the segments 35 at its exact position. The segments 35 and 36 shunt in such a manner simultaneously, when the shifting sleeve 14 thrusts out, to complete arrangements for the insertion of the pipe 1, as shown in FIG. 6.

Figure 10:
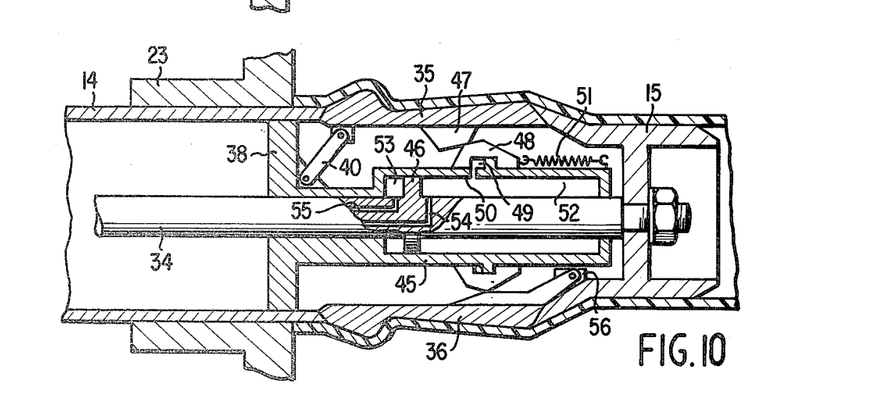
FIG. 10 is a sectional view of a modification of the metallic core mold shown in FIG. 7.
Figure 11:
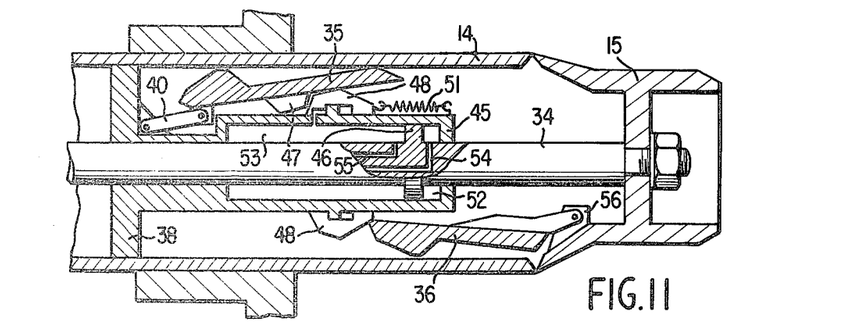
FIG. 11 is a working illustration of the metallic core mold shown in FIG. 10.

FIGS. 10 and 11 show a metallic core mold of another embodiment of this invention. FIG. 10 illustrates a state where segments are held in the radial direction, while FIG. 11 shows a state where they are longitudinally displaced. Segments 35 and 36 are pivot-supported, respectively, through each link arm 40 and leg lever, here also in the same manner as shown in the foregoing example, but in the present example the positioning of segments in the radial direction is performed by a thrust ring 48, and the shifting barrel 38, which supports the mobile segments 35, is slid along the core axle 34 by different means. Namely, a part of the shifting barrel 38 is made to be a cylinder part 45, which constitutes cylinder chambers 52 and 53 together with a piston part 46. On the other circumference of the cylinder part 45 is slidably provided the thrust ring 48, which composes a cylinder chamber 49 on its own base side. This cylinder chamber 49 is so constructed as to position therein a thrust spring which is a constitutent of the piston part formed on the outer circumference of the cylinder part 45. On the other hand, air conduits 54 and 55 provided within the core axle 34 communicate with the cylinder chambers 52 and 53 of the cylinder part 45, and have openings therein. Another air conduit 50 connects the cylinder chamber 52 with the cylinder chamber 49 of the thrust ring 48. FIG. 10, as a result, shows that a dint of the pressure medium, or preferably air pressure, the shifting barrel 38 moves forward in the direction of the front end of the metallic core mold and the thrust ring 48 shifts in the opposite direction to expand segments 35 and 36 in the radial direction, respectively.

Reference numeral 47 is a projection fitted on the back side of the segment 35. The radial diaplacement of the segments 35 and 36 are regulated by the shifting sleeve 14 and fixed sleeve 15, and surely held by the thrust ring 48. On completig the formation of a pipe connecting socket part, likewise as stated previously,the metallic core mold is released, as seen in FIG. 11. To be more precise, by virtue of depression of the cylinder chamber 52, the thrust ring 48 is drawn up to the original position to release the expansion of the segments 35 and 36 at the same time the pressure medium is introduced into the cylinder chamber 53 to draw the shifting barrel 38 backwards. Thereby the segment 35 inclines in the longitudinal direction through the link arm 40, and the segment 36 leans in the same way in the longitudinal direction by empty weight or through a spring (not shown in the figure) attached to the pivot part of the leg lever, etc., as shown in FIG. 11. Almost at the same time when the shifting barrel 38 is drawn backwards, the shifting sleeve 14 thrusts forward to block the metallic core mold while mantling both segments 35 and 36. As a consequence, even if a pressure medium is introduced into the cylinder chamber 53 of the shifting barrel 38, the thrust ring 48 is not permitted to move the remains in contact with the projection 47 of the segment 35, because the pointed end of the segment 35 is controlled in the interior of the shifting sleeve 14. These metallic core molds of such a kind are all able to meet the intention of the present invention because segments, regardless of whether mobile or fixed, have a superficies for forming a groove and room for play for use in molding a connecting socket part on a pipe end, and further a very reasonable means for shifting in the radial direction, and so on.

Now, another example of a metallic core mold can be seen in FIGS. 12 to 19. This type, in addition to the above-mentioned, has the ability to surely keep the intended and preferable position-setting.

Figure 12:
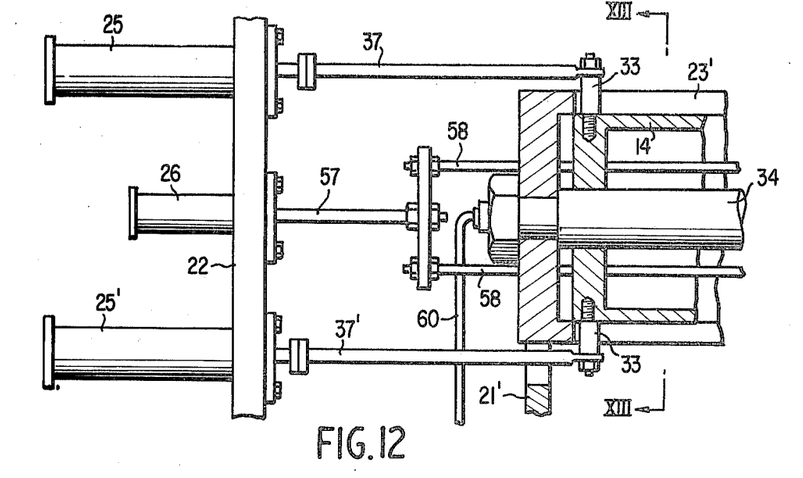
FIG. 12 shows a greatly enlarged part of FIG. 7 in section.
Figure 13:
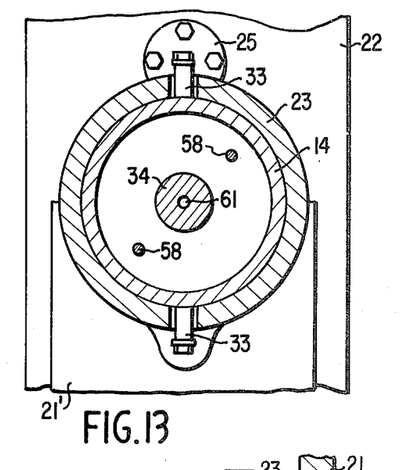
FIG. 13 is a cross sectional view taken in the direction of the arrows substantially along the section line XIII—XIII of FIG. 12.
Figure 14:
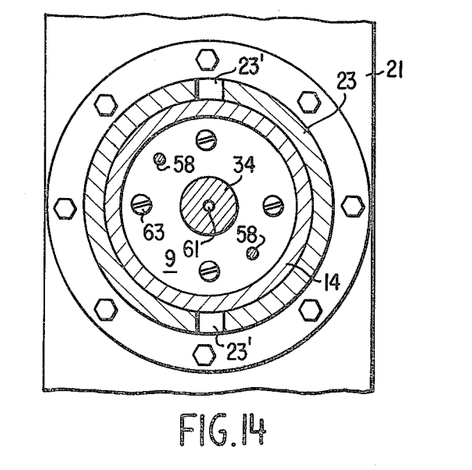
FIG. 14 is a cross sectional view taken in the direction of the arrows substantially along the section line XIV—XIV of FIG. 5.
Figure 15:
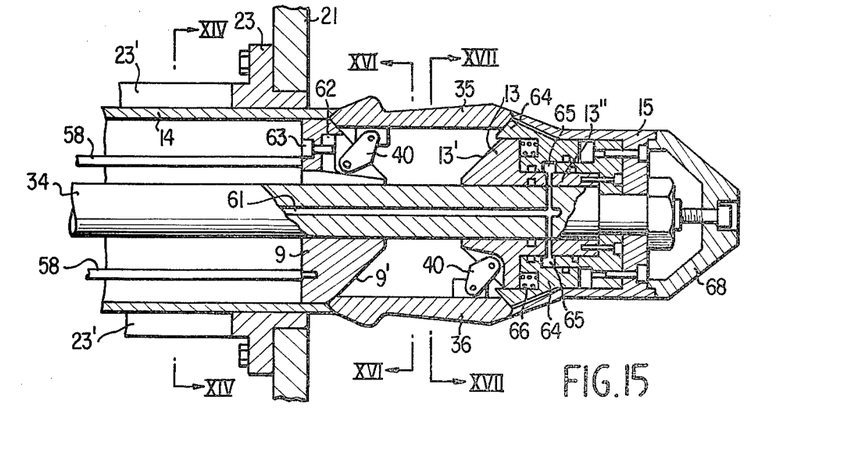
FIG. 15 is a longitudinal sectional view showing a preferred embodiment of the metallic core mold in accordance with the present invention.
Figure 16:
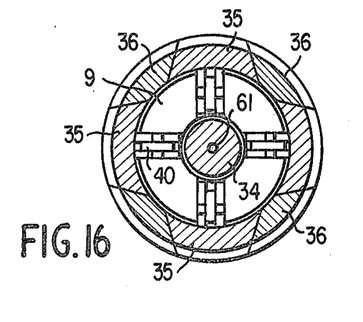
FIG. 16 is a cross sectional view taken in the direction of the arrows substantially along the section line XVI—XVI of FIG. 15.
Figure 17:
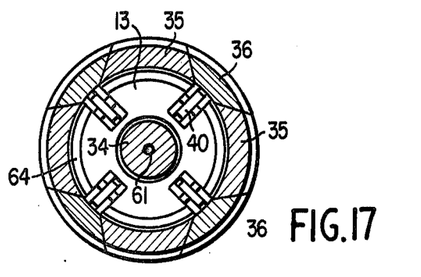
FIG. 17 is a cross sectional view taken in the direction of the arrows substantially along the section XVII—XVII of FIG. 15.

FIG. 15 shows the state where the shifting sleeve 14 moves back and the segments 35 and 36 are held, having expanded in the radial direction. The end part of a synthetic resinous pipe may be inserted thereinto in such a state, or it may be thought that after the insertion of the pipe end, segments are expanded in the radial direction to complete the formation of the pipe end. Reference numeral 23 is a supporting barrel constituted similarly as the previous example. It supports the shifting sleeve 14 and is equipped with the core axle 34 in its central part. A shifting annulus 9 is slidably set on this core axle 34 and its shifting is actuated by working levers 58. As shown in FIGS. 12, 13 and 14, these two levers 58 penetrate through the supporting barrel 23 and shifting sleeve 14, but, independently of them, are coupled with the working cylinder 26 through the medium of a connecting lever 57. Owing to this, the shifting annulus 9 moves on the core axle 34 by means of the working cylinder 36. The exterior of the shifting annulus 9, which is of cone shape, forms an inclined surface 9′, where a concave is made up radially. To this concave is attached a pivot suspension 62 for the segment 35. Reference numeral 63 indicates its fitting bolt. Segments 35 are radially supported through the shifting annulus 9 and link arm 40, respectively, to form mobile segments, as shown in FIG. 16. To the contrary, segments 36 are set on the fixed annulus 13, which is attached to the core axle 34. The front part of the interior of the fixed annulus 13 forms an inclined face 13′, which constitutes a sliding surface along which the end parts of fixed segments facing each other are expanded in the radial direction. The inclinded face or boss part 13″ is slidably provided with the constraint annulus 64, which is constructed so as to positively hold the position of each segment. In other words, the constraint annulus 64 is inserted floatingly into the boss part 13″ and forms a cylinder chamber 65 on its sliding face in conjunction with a fitting member 67. This cylinder chamber 65 communicates with a passage 61 which is formed through the center part of the core axle 34. It goes without saying that the passage 61 also penetrates through the boss part 13″ of the fixed annulus 13. Between the constraint annulus 64 and fixed annulus 13, further there is placed a spring 66 working in the direction of separating these elements from each other. The suitable number of such springs 66 is housed in a spring chamber formed on the impinging surface. FIG. 16 shows the state of the constraint annulus 64's being thrust-out where the spring 66 is kept in the compressed state and the segment group is pressure-held by introducing a pressure medium into the cylinder 65. The one end part (fitting side of the metallic core mold) of each segment is held both on the top part of the inclined face of the shifting annulus 9 and on the pointed end face of the shifting sleeve 14, while the end part is kept by applying pressure to the constraint annulus 64 jointly with the end edge of the fixed sleeve 15. Consequently, the link arm 40, which connects each segment to the shifting or fixed annuluses, is no more then a mere coupling jig so that it does not at all suffer from any force otherwise produced in supporting the segments. Thus, the pivoting part of the link arm may have a play. Particularly, seeing that the mobile segment 35 is to be kept by the top of the inclined face of the shifting annulus 9 in the capacity of a supporting point, the pivoting part of the link arm would just as soon be left to have some play.

Figure 18:
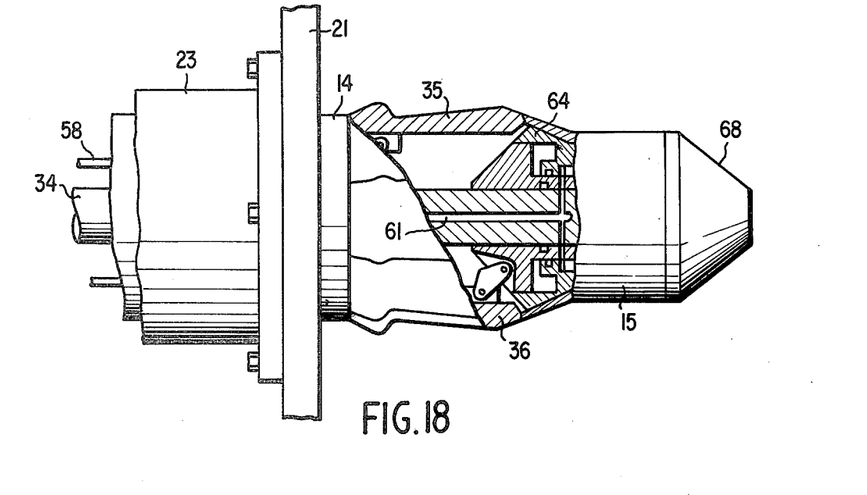
FIG. 18 is a working illustrating of FIG. 15, showing a constraint annulus 64 in its shunting position.
Figure 19:
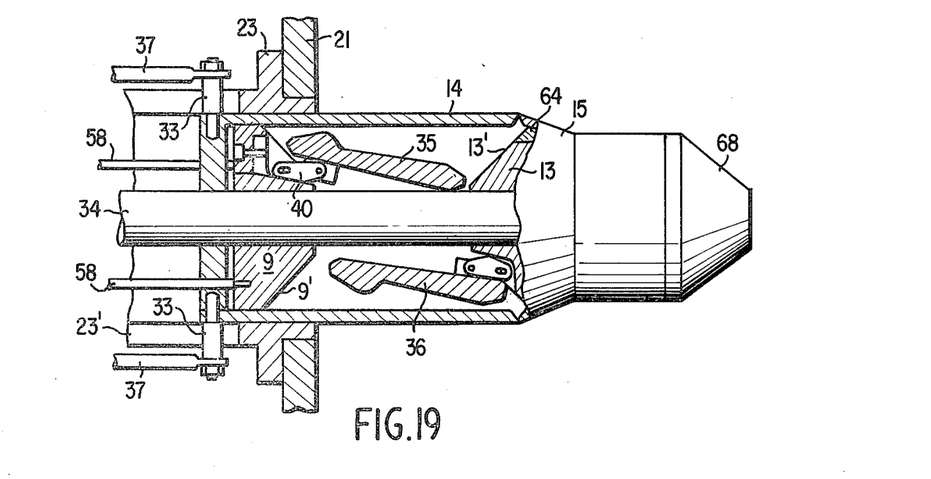
FIG. 19 is a variant form of FIG. 15, showing each segment in its own shunting position.

The metallic core mold, which is assembled in such a manner as described hitherto, is dimantled and released when a softened pipe end inserted thereinto has finished the formation. FIG. 18 shows the commencement of its releasing process. That is, when the introduction of a pressure medium through the passage 61 formed within the core axle comes to an end, the constraint annulus 64 is pushed backwards under pressure of the spring 66 and its holding surface is brought in line with the inclined face 13′ of the fixed annulus 13 concurrently when the mobile segment 35 inevitably moves toward the fixed annulus 13 at the other end which is not supported by the link arm 40 thereof. On the other hand, when the shifting annulus 9 draws back through the working cylinder 26, the mobile segment 35 moves toward the core axle 34 with the rotation of the link arm 40 to be held nearly parallel to the core axle 34. Further, as the shifting annulus 9 still further retreats, the segment 35 shifts, being dragged by the link arm 40 in the direction of the core axle 34, up to the state as shown in FIG. 19. Moreover, almost with the retreat of the shifting annulus 9, the shifting sleeve 14 moves forward by means of the working cylinders 25 and 25′ until it impinges upon the fixed sleeve 15 and stops, when the mobile segment 35 spontaneously shifts in the direction of the core axle 34. In order to better facilitate its displacement, some spring member may be placed on the pivoting part of the link arm 40, if necessary.

On the other hand, a gap is created on both sides of the fixed segment 36 as a result of the displacement of the mobile segment 35. The fixed segment 36 will be allowed to take its position, such as shown in FIG. 19, within the scope of this gap. Accordingly, it may be preferable that a spring member similar to the previous case is arranged also on the pivoting part of the link arm 40 of the fixed segment 36 so that this segment 36 may actively come into the position as possible as shown in FIG. 19. FIG. 19 expresses the state where the pipe 1 is about to be inserted equally as shown in FIG. 6. While the pipe 1 is inserted and the shifting sleeve 14 draws back, the shifting annulus 9 moves forward at the same time. The forward movement of the shifting annulus 9 makes the mobile segment 35 advance with the aid of the link arm 40. The moment the front part of the segment 35 impinges upon the fixed annulus 13, whereby the segment 35 is radially expanded along the inclined surface 13' of the fixed annulus 13. Then follows the rising of the link arm 40. On the other hand, in the course of the displacement of the shifting annulus 9, the end part of the fixed segment 36 is picked up by the inclined surface 9' of the shifting annulus 9, thereby the segment 36 being radially expanded sliding up along its own angular pointed end of the inclined surface 9' of the shifting annulus 9, on one side, and the inclined surface 13' of the fixed annulus 13, on the other side, and further being strongly kept by the pressure shifting of the constraint annulus 64.

Figure 20:
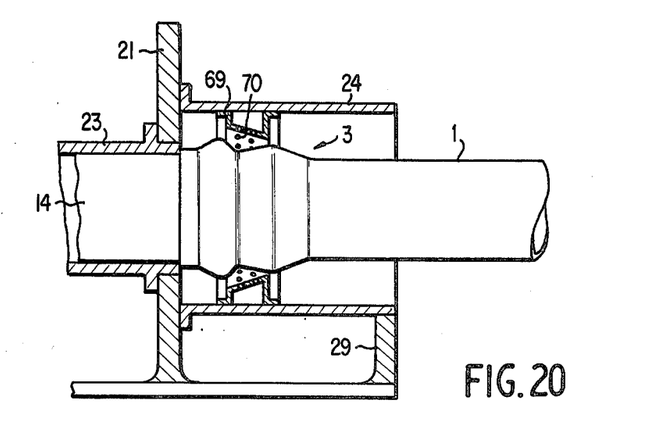
FIG. 20 shows an example of molding means, wherein a jet press molding means and a cooling means can be seen within the outer barrel in section.
Figure 21:
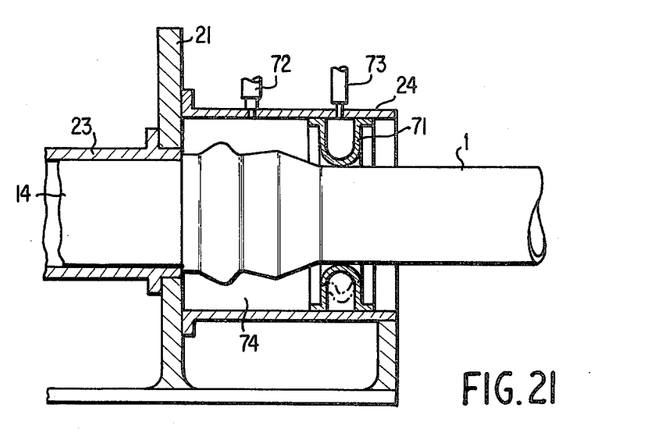
FIG. 21 is also an example of molding means, shown in the same manner as FIG. 20, wherein an airtight chamber is illustrated.
Figure 23:
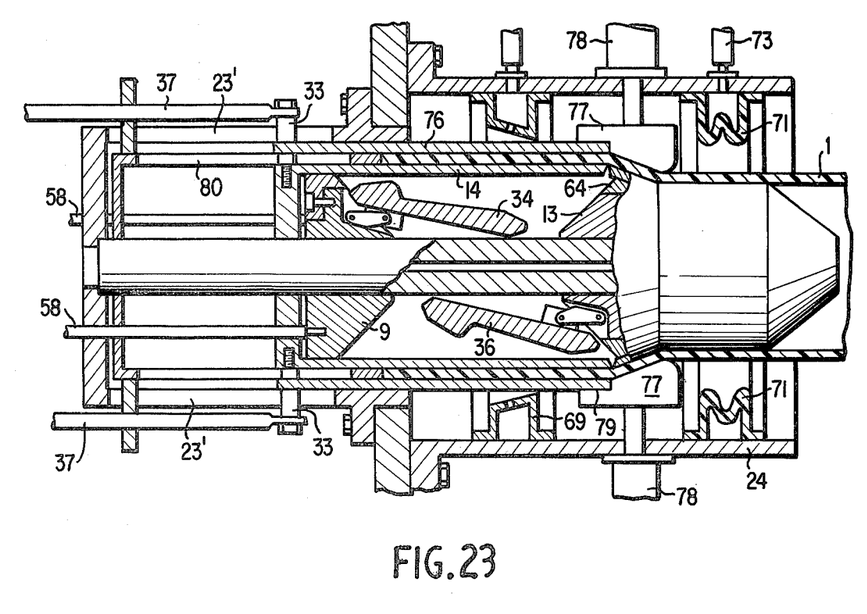
FIG. 23 is a longitudinal sectional view of the metallic core mold incorporating a wall thickening means into the press molding means, only before the thickening operation.

In forming a connecting socket part on a pipe end, only if a metallic core mold thus constituted is used, does it become possible to form simultaneously the groove 4 and the space 6 at one time. For this, however, an outer mold is not to be dispensed with for use in forming the external form of the connecting socket part. Be that as it may, some of conventional outer molds covered no more than a part of the circumferential surface of a pipe, as illustrated in FIG. 3' others handled the external form of a pipe solely by the help of the formation based on the expansion of segments one-sidely. As a result, there was present the disadvantage that the gap between the outer circumferential surface of the metallic core mold and the inner circumferential surface of the outer mold was sometimes different from the wall thickness of the pipe which was to be molded or that forming pressure could not uniformly be applied to the unevenness of the wall thickness undesirably often resulted in a change in the internal diameter on the connecting socket of the pipe. Considering these circumstances, it would be recommendable to apply a metallic core mold, so composed as mentioned previously, on the basis of a molding method which is able to make the outer mold equivalent in shape to the metallic core mold in forming a pipe connecting socket part of such a type. FIGS. 20, 21 and 23 are illustrations of the variations of such means. All figures represent the state where the one end of a softened pipe has already been inserted, segments have been radially expanded, as formerly described, and the formation work is completed. The outer barrel 24 and supporting barrel 23 are shown in section.

Complying with the method depicted in FIG. 20, on the inside of the outer barrel 24 is provided a jet nozzle pipe indicated by a reference numeral 69. This pipe 69 is provided so as to locate on the fringe of the metallic core mold for forming purpose. On the top surface are provided openings 70 directed toward the metallic core mold. Specifically to mention, these openings 70 are preferably directed to the intersecting part of the extruded groove 4 and the space 6 in the connecting socket part so as to parallel its concave part along the metallic core mold. The pipe 69 is connected to a pressure-feeding pipe (not shown in the figure). As pressure matter are utilized air, water or mist, singly or in a mixture. Among them, most preferably is a spray mist of air and water. The pipe 1 is pressed hard against the metallic core mold by the use of jet pressure of air or water and is formed to the connecting socket part. The temperatures of air or water can be freely controlled, so they will make it possible to facilitate soft-forming or to promote shortening the formation time by rapid cooling of the heated pipe. Incidently, it may be probable to work automatically by combining these two processes: first, forming by air pressure, and then cooling by water.

In FIG. 21, the interior of the outer barrel 24 is in the pressurized state, with the result that the connecting socket part of the pipe is pressed hard on the metallic core mold. On the inlet side of the outer barrel 24 is set up an expansion tube 71 which is elastic like a tire-tube of a vehicle. The expansion tube 71 is connected to an air pressure feeding pipe 73. It expands when air pressure is introduced therein and comes to support, embracing the metallic core mold through the pipe 1, while a space 74 within the outer barrel 24 forms an air tight chamber. Reference numeral 72 is a connecting pipe which introduces air pressure into this air tight space 74. By the application of this air pressure the pipe connecting socket is pressed hard to the metallic core mold 30 and thus is formed.

Figure 22:
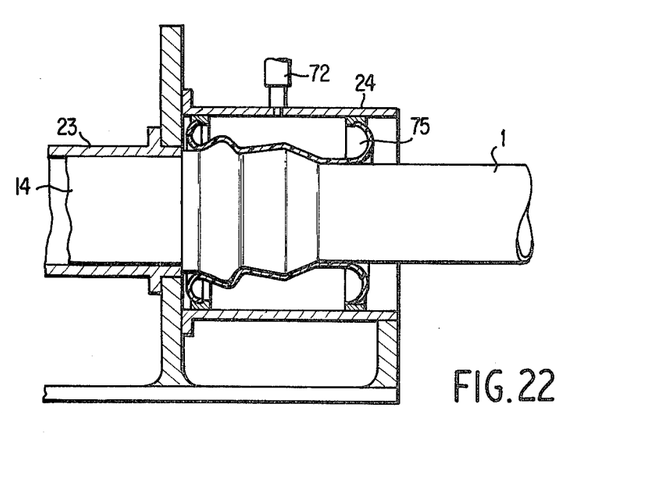
FIG. 22 is another example of molding means shown in the same manner as FIG. 20, wherein a kind of bag is employed by way of a molding means.

FIG. 22 shows that an expansion bag 75 is provided within the outer barrel 24. This bag 75 is so arranged as to cover the connecting socket part of the pipe end as a whole. With this bag 75 is interconnected an air pressure feeding pipe 72 for the introduction of air pressure thereinto, so that bag 75 expands. This expansion presses the pipe 1 hard on the outer circumference of the metallic core mold 30 so as to effect the desired formation.

For all that, according to these methods, where metallic core molds of such a type are used, the wall thickness of the connecting socket part of the pipe grows thinner compared with the rest of the pipe in general. Consequently, from a view point of avoiding such a weakness, the end part of the pipe which is to be formed into the connecting socket part can be made thicker beforehand. But there is a trouble in manufacturing such a pipe where a uniform thickness is aimed at, or more in the requirements for some special marks and precautions indispensable to position the thick part surely corresponding to the connecting socket part. With these circumstances in mind, attention is now directed to the fact that it is most advantageous to construct a means for thickening the pipe wall in one body using the metallic core mold so as to augment in advance the thickness of the connecting socket part at the end of the pipe and to make the very portion get as thick as the remaining part after completion of forming, while employing the same kind of metallic core mold as hitherto described.

Figure 24:
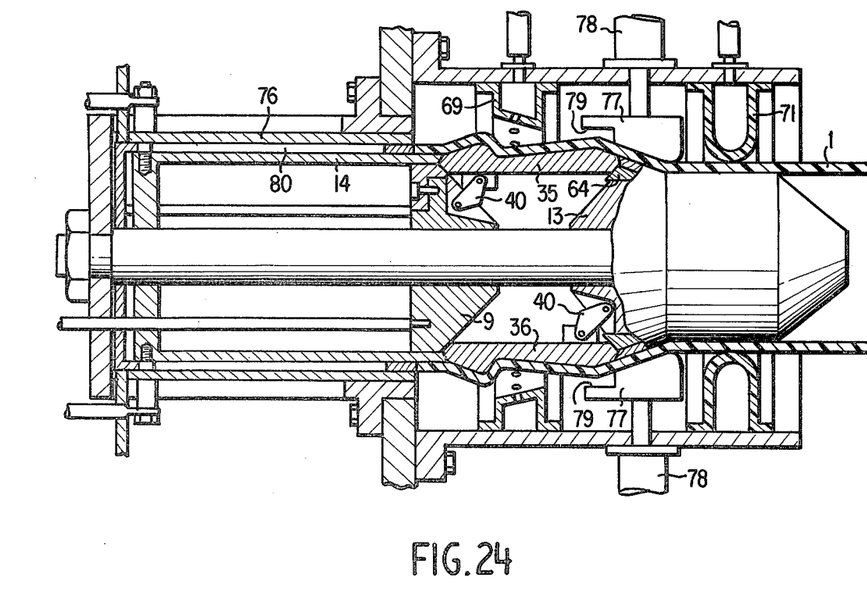
FIG. 24 is a sectional view illustrating the operation of thickening-molding with reference to FIG. 23, at the conclusion of the molding operation.

Reference is now made to the diagramatic illustrations of FIGS. 23 and 24 which indicate the means for thickening in the case of employment of the metallic core mold shown in FIG. 15. Hereupon, an external diameter regulating barrel 76 is provided on the outer circumference of the shifting sleeve 14 by creating a space whose wall thickness is nearly as large as, or a little larger than, that of the pipe 1. The barrel 76 is slidably provided by enlarging in size the supporting barrel 23. The figure shows that the shifting sleeve 14 and barrel 76 shift at the same time in connection with each other. That is to say, to the fixture 33 of the shifting sleeve 14 is attached the external diameter regulating barrel 76, keeping the above-mentioned space. In this space is provided a compression annulus 80, which forms a shifting slit and is slidably provided through the space between the shifting sleeve 14 and external diameter regulating barrel 76. The compression annulus 80 has only to be constructed so as to be put in sliding motion by a cylinder (not shown in the figure) provided on the back wall of the supporting barrel 23. Further, an embracing member 77 is provided, being located on the extended inclined part of the metallic core mold within the interior of the outer barrel 24. This embracing member 77 of the split-type is so constructed as the outer mold, and is located so as to form a space within the limits of the wall thickness augmentation of the extended pipe shoulder part. On the embracing member 77 and on its side facing the extended inclined part of the metallic core mold is formed a step 79, which controls the end part of the external diameter regulating barrel 76.

FIG. 23 shows the state of the softened pipe end sheathing the metal core mold. The pipe 1, which is formed with uniform wall thickness, is expanded along the outer circumferential inclined surface of the fixed sleeve 15 while being inserted toward the metallic core mold and is loaded on the shifting sleeve 14, at the time when the compression annulus 80 maintains the retreat position and the end of the inserted pipe falls under the control of its insertion at the end face of the compression annulus 80, so that the pipe end is inserted into the space formed by the shifting sleeve 14 and external diameter regulating barrel 76. However, this space, as mentioned above, is only constructed as large as, or a little larger than, the wall thickness of the pipe, so that the wall thickness of the pipe inserted thereinto grows thinner because the diameter of the pipe is extended after its passing through the extended inclined part of the metallic core mold. As a result, there still remains a vacant space between the inside of the external diameter regulating barrel 76 and the outer circumferential surface of the pipe. Now, the above-mentioned embracing member 77 operates to press the pipe close to the metallic core mold and hold it. Then the compression annulus 80 moves forward to compress the end of the pipe. As the pipe is covered at the step of the embracing member 77, the pipe which has grown thinner on the outer circumference of the shifting sleeve 14 is compressed and increased in the thickness as filling up the space formed on the inside of the external diameter regulating barrel 76. Subsequently, in the meantime, when the embracing member 77 and compression annulus 80 remain each in their own original position, the shifting sleeve 14 and external diameter regulating barrel 76 move backward. Then, the shifting annulus 9 shifts, expands both segments 35 and 36 in the radial direction and forms the connecting socket part on the end of the pipe.

FIG. 24 shows the state of the conclusion of molding. Incidently, it may be possible to employ the holding means for use in inserting the pipe as compression means for pipe wall thickening in place of the compression annulus 80, if necessary. Or again, as mentioned previously, it is recommendable to apply some cooling means for a formed pipe on the outer circumference thereof. Such operation can be performed by means of the jet nozzle 69 or the expansion tube 71 and the like. In such a way, as the dimension of the space created between the shifting sleeve 14 and external diameter regulating barrel 76 can be properly preset in accordance with the desirable degree of augmentation of the pipe wall thickness prior to the molding operation, it is possible to obtain a pressure-resistant connecting socket part of excellent quality for the sake of the pipe.

To summarize what is hitherto described, the connecting socket part, which is to be given on the pipe end in accordance with the present invention, is provided with a groove for use in inserting a resilient packing and has a space in such a shape as to gradually widen in the direction of the pipe body. The group of segments constituting the metallic core mold for use in molding has such a top surface as to be able to integrally mold the groove and space. Each segment, regardless whether of the mobile type or the fixed type, is formed in one and the same-shaped top surface and is arranged along the axial direction of the pipe. They are so constructed as to be held by their individual sides by the force of the shifting annulus and link arms, that their positioning at the time of assembling or dismantling is effected with unexampled correctness. Further, by applying some kind of pressure molding means to such a constitutionally undulating connecting socket part, it becomes possible to obtain a connecting socket part of the pipe end which is equivalent in shape to its metallic core mold, leaving nothing to be desired. In a word, the present invention aims at the provision of a method of molding a connecting socket part of a pipe, in order to enable a reliable molding operation, easy forming processes, and the production of economical pipe connecting socket parts of high quality.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of integrally molding a pipe connecting socket on a pipe end wherein a thermoplastic synthetic resinous pipe is temporarily heated to be softened and is molded while being enlarged in a bell-shape for the purpose of being connected with the end of another pipe by the application of a metallic core mold, which comprises:

disposing at least the heat-softened end of said synthetic resinous pipe over a sleeve which sheathes a forming core;

augmenting the wall thickness of said synthetic resinous pipe by surrounding the exterior surface of said pipe with an external diameter-regulating barrel such that a space corresponding to a desired wall thickness of said pipe is formed between said sleeve and said barrel, and longitudinally compressing the end of said pipe by operation of a compression annulus slidably movable in said space such that the end of said pipe is longitudinally compressed and thereby completely fills said space;

radially outwardly swelling a portion of said heated resinous pipe end to form a ring groove for receiving a resilient packing near the end of said bell-shaped socket portion of said synthetic resinous pipe; and simultaneously with said step of swelling radially outwardly swelling another portion of said heated resinous pipe longitudinally inwardly disposed of said ring groove for providing a radially outwardly bulged space inward of said ring groove, said space permitting said another pipe inserted therein to be able to pivot eccentrically through a slight degree under external pressure;

wherein said simultaneous radially outwardly swelling of said portions of said heated resinous pipes for forming said ring groove and said radially outwardly bulging space is accomplished by radially spreading segments of said forming core while withdrawing said sleeve.

2. A method as claimed in claim 1, wherein said segments of said forming core includes a group of segments having a circumferential top surface of an identical shape, respectively, being supported by a shifting annulus and pivotably connected thereto through the medium of link arms and another group of segments being supported by a fixed annulus, said segments of both groups being assembled alternately within said forming core, said link arms having each of several pivoting parts of loose concentration, and being so made as to be able to regulate the falling positions of said segments.

3. A method as claimed in claim 2, wherein said segments which are connected to said shifting annulus have on both sides inclined surfaces enlarging in the perpendicular direction to the axis of said forming core and are constructed freely movable in the axial direction thereof, and said segments which are connected to said fixed annulus have inclined surfaces reverse to said segments which are connected to said shifting annulus and are so constructed as to be supported respectively on both sides thereof at a time of their assembling into said forming core in company with said segments which are connected to said shifting annulus.

4. A method as claimed in claim 1, wherein a means which radially shifts said segments is put in operation with the help of fluid pressure of a cylinder.

* * * * *